United States Patent
Siemer et al.

(10) Patent No.: US 7,909,313 B2
(45) Date of Patent: Mar. 22, 2011

(54) BUSH BEARING WITH BEARING BODY HAVING AN AXIAL PROFILE

(75) Inventors: Hubert Siemer, Dinklage (DE); Tim-Malte Franke, Damme (DE); Claudia Hoping, Lohne (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 944 days.

(21) Appl. No.: 11/696,547

(22) Filed: Apr. 4, 2007

(65) Prior Publication Data
US 2007/0258671 A1     Nov. 8, 2007

(30) Foreign Application Priority Data
May 4, 2006 (DE) .................. 10 2006 021 011

(51) Int. Cl.
B60G 11/18 (2006.01)
(52) U.S. Cl. ..................................... 267/279; 267/141.3
(58) Field of Classification Search ............... 267/141.5, 267/279–283, 292–294; 384/140, 222
See application file for complete search history.

(56) References Cited

U.S. PATENT DOCUMENTS

| | | | |
|---|---|---|---|
| 2,562,381 A | | 7/1951 | Goldsmith |
| 4,634,108 A | * | 1/1987 | Munch .......................... 267/279 |
| 5,058,867 A | * | 10/1991 | Hadano et al. ............. 267/141.3 |
| 5,263,778 A | * | 11/1993 | Jordens et al. ................. 384/140 |
| 5,338,012 A | * | 8/1994 | Kranick ...................... 267/140.5 |
| 6,575,441 B2 | * | 6/2003 | Lefebvre ........................ 267/281 |
| 6,644,633 B2 | * | 11/2003 | Graeve ..................... 267/140.12 |
| 7,017,890 B2 | * | 3/2006 | Rechtien ..................... 267/141.3 |
| 2004/0046298 A1 | * | 3/2004 | Takeshita et al. ............. 267/293 |
| 2004/0213491 A1 | * | 10/2004 | Kammel et al. ............... 384/222 |

FOREIGN PATENT DOCUMENTS

| | | |
|---|---|---|
| BE | 494 084 | 6/1950 |
| DE | 40 25 100 A1 | 2/1992 |
| DE | 41 38 582 | 7/1993 |
| DE | 689 05 623 | 9/1993 |
| DE | 691 13 955 T2 | 3/1996 |
| DE | 198 59 067 A1 | 7/2000 |
| DE | 697 03 496 T2 | 5/2001 |
| DE | 100 04 936 A1 | 8/2001 |
| DE | 101 18 229 A1 | 11/2002 |
| DE | 601 06 767 T2 | 2/2006 |

* cited by examiner

*Primary Examiner* — Christopher P Schwartz
(74) *Attorney, Agent, or Firm* — Norris McLaughlin & Marcus, PA; Christa Hildebrand, Esq.

(57) ABSTRACT

An elastomer bush bearing, wherein the bearing body (2) is encapsulated through axial flanges (4, 4') of the outer bearing sleeve (3), with the bush bearing having an elastomer bearing body (2) with a special profile in the axial direction. The bearing body (2) is employed in constructing the bush bearing of the invention, which is capable of supporting high radial loads even with low radial stiffness and without adversely affecting its stability and service life. The two axial end faces (5, 5') of the bearing body (1) each have undulated contours which extend in the circumferential direction (u) in the same direction, both with respect to one another and also over the entire region of the material thickness (d) of the bearing body (2). The end faces (5, 5') of the bearing body (2) thus have wave troughs (6, 6', 7, 7') and wave crests (8, 8', 9, 9'), whereby the corresponding wave troughs (6, 6', 7, 7') of both end faces (5, 5') and their wave crests (8, 8', 9, 9') are formed so as to face one another, and each extend radially over the entire material thickness (d) of the bearing body (2) in the respective circumferential segment.

5 Claims, 2 Drawing Sheets

BUSH BEARING WITH BEARING BODY HAVING AN AXIAL PROFILE

BACKGROUND OF THE INVENTION

1. Field of the Invention

The present invention relates to an elastomer bush bearing according to the preamble of the independent claim. More particularly, the invention relates to a bush bearing, wherein the bearing body is encapsulated by axial flanges of the outer sleeve of the bearing and wherein the bush bearing has an elastomer bearing body with a particular profile extending in the axial direction.

2. Description of the Related Art

Elastomer bush bearings, which are employed frequently in the automotive engineering for supporting chassis components, consist essentially of a cylindrical or tubular metallic inner part, an elastomer bearing body which concentrically surrounds the inner part, and an outer sleeve receiving the inner part with the bearing body. The elastomer bearing body, for example, a rubber spring, is generally adheringly connected at least with the inner part by vulcanization. In several embodiments of corresponding bearings and depending on the respective application, the generally also metallic outer sleeve has a flange or flanges on its axial ends. Forming a flange of the axial ends provides, for example, axial limits stops and axial flanges as well as an axial retaining element, which prevents the bearing body from slipping out of the outer sleeve when an axial load is applied. The flange is also prevents contamination from entering the bearing. A bush bearing having an outer sleeve with flanged axial ends is disclosed, for example, in the form of a bearing with hydraulic damping in DE 101 18 229 A1.

Bearings are also known for achieving a radial damping characteristic that varies in the circumferential direction of the bearing, wherein the bearing body is suitably profiled or wherein the circumference of the bearing body has sections with recesses or is exposed with respect to the bearing sleeve. Corresponding bearings are disclosed, for example, in DE 198 59 067 A1 or DE 100 04 936 A1. The bearings described in the aforementioned published applications, however, do not have a flange formed on the outer sleeve. DE 601 06 767 T2 discloses an elastic joint wherein the end faces of the bearing body are contoured with a wave-like and simultaneously helical pattern for obtaining regions with different radial stiffness in the circumferential direction. The helical twist of the end-face contours of the bearing body of the corresponding joint is optimized, in particular, for torsional loads, wherein the outer sleeve, like in the two aforedescribed bearings, does not have a flange.

As already described, the axial ends of the outer sleeve of a rubber bearing are flanged, for example, for realizing an axial retaining element. Due to the flange, such bearings have a relatively high radial stiffness, accompanied by a high axial stiffness. These in bearings are capable of supporting high radial loads due to the high radial and axial stiffness and the encapsulation of the rubber body. However, in certain applications a corresponding bush bearing may be required to support high radial loads, but should at the same time still have a smaller radial stiffness and a softer radial spring characteristic, for example when radial oscillations with smaller amplitudes are introduced. The smaller radial stiffness can be easily achieved by appropriate selection of the elastomer material forming the bearing body. However, as long as the bearing is still subjected to high radial loads, there is still a risk that the bearing body, or the rubber body, expands partially across the flange out of the bearing body, allowing the expanding material to be sheared off at the flange under the load. This disadvantageously reduces the service life and stability of the bearing.

SUMMARY OF THE INVENTION

It is therefore an object of the invention to form a bush bearing with a bearing body capped by axial flanges such that the bearing body is capable of supporting high radial loads without adversely affecting its stability and service life.

This object is solved with a bush bearing having the features of the independent claim. Advantageous embodiments or modifications of the invention are recited in the dependent claims.

The proposed elastomer bush bearing includes, as is generally known, a metallic inner part with a circular or elliptical cross-sectional area and a through opening extending in the axial direction through the inner part, a cylindrical outer sleeve surrounding the inner part, and an elastomer bearing body disposed between the inner part and the outer sleeve and adheringly connected at least with the inner part by vulcanization. The inner part can be formed, for example, as a cold-extruded steel, or aluminum part or can be produced from an extruded tube, or can be a diecast aluminum part. The outer sleeve is preferably also metallic, i.e., made of aluminum or steel, but can optionally also be made of plastic. The outer sleeve has on each of its axial ends a circumferential flange oriented toward the inner part. In this way, the bearing body is encapsulated which makes the bearing suitable for supporting high axial loads.

According to the invention, the two axial end faces of the bearing body have undulated contours extending in the same direction along the circumference, both with respect to one another and with respect to the radial material thickness of the bearing body. The end faces of the bearing body thus have wave troughs and wave crests, wherein the wave crests of both end faces as well as the associated wave crests face one another. Stated differently, when the bearing is load-free, the wave troughs and wave crests, respectively, are formed on both end faces in the same circumferential segment, wherein a wave trough and a wave crest appears as a wave trough and a wave crest with respect to the entire material thickness that determines the radial extent and the width of the bearing body. The inner contour line of an axial end face of the bearing body and its outer contour line have the same curve shape, i.e., have the same phase relative to the employed image of the wave. With this type of contouring of the end faces of the bearing body, the height of the bearing body along the axial direction varies continuously in the circumferential direction between a minimum height and a maximum height.

With the design of the bearing according to the invention, the elastomer is able to yield to the applied high radial loads in the axial direction, i.e., in the direction of the respective flange, in the region of the wave troughs, which during proper installation of the bearing coincide with the main radial load bearing direction, without expanding from the outer sleeve of the bearing out of the flange edge. This prevents the expanded material of the bearing body from being sheared off at the flange edge, which can decrease the service life of the bearing. It is therefore possible to realize bearings which have a decreased radial stiffness with an only slightly changed bearing geometry and an almost identical axial stiffness, without adversely affecting the stability or the service life, or more particularly the radial load bearing capacity.

According to an advantageous embodiment, the bearing has an inner part with a circular cross-sectional area, wherein the end faces of its elastomer bearing body have a sinusoidal contour by forming two wave troughs and wave crests extending in the same direction and/or with the same phase. It should also be mentioned that a contour extending in the same directions does not necessarily imply that the wave troughs and wave crests each have identical depth or identical height with respect to the radial material thickness of the bearing body or when comparing the two radial end faces. It only implies that in a circumferential region, where a wave trough is formed on the outer surface of the bearing body contacting the inner surface of the bearing sleeve, a trough is also formed on the inner surface of the bearing a body contacting the inner part. The same applies to the identical circumferential segment on the opposite axial end face. The inner part of the bearing of the invention is preferably formed essentially as a cylinder. Because the aforedescribed design of the bearing is not intended to achieve a radial stiffness that varies in the circumferential direction, the inner part can have different shapes that compensate at least partially differences in the radial stiffness due contouring of the bearing body on the end side in the circumferential direction. In another similar embodiment with an inner part, distribution of the stress generated in the elastomer during loading is improved by expanding the outside contour to form a bulge in an axial center section, either in a circumferential segment or across the entire circumference. Advantageously, the axial stiffness is also affected positively. The bulge-shaped expansion of the outer contour of the bearing body, i.e., a segment-wise increase in the outside diameter, can be implemented, for example, by spraying a plastic material around the respective region.

A radial stiffness which remains approximately constant over the entire circumference of the bearing, can also be attained by forming the elastomer bearing body of different elastomer materials. In a corresponding embodiment of the bearing of the invention, spray-on points for spraying on different materials are provided on the outer surface of the inner part in the region of the waves troughs and wave crests. The materials are hereby selected so that the material sprayed on in the region of the wave crests, when the radial stiffness of the bearing body is already small, has a smaller basic stiffness than the elastomer material used in the region of the wave troughs. This is indicated, in particular, when significantly lower loads are expected in the secondary load direction, which coincides with the wave crests, than in the main load direction, which also eliminates the risk that the elastomer expands to the outside.

According to an advantageous modification of the bearing of the invention, means are formed on the bearing for marking its respective position with respect to the circumference. This provides a positioning aid for mounting the bearing in an automobile and/or its temporal installation by a mounting device. This guarantees proper orientation of the bearing during installation, so that the wave troughs formed on the end faces of the bearing body are arranged in the main load direction.

The position marking can be implemented in different ways. According to one embodiment, a groove is formed on the inner surface of the inner part which surrounds the through opening. The groove extends from one of the axial end faces in the axial direction into the bearing interior or to the corresponding other end face. In another embodiment, a fin may be formed of the elastomer of the bearing body, with the fin protruding from the otherwise undulated contour of at least one end face of the bearing body. A similar arrangement can also be realized by forming a nose outside the bearing body on the outer surface and as an integral part of the inner part. Depending on the intended application of the bearing, the bearing body can be pretensioned axially and/or radially during installation of the bearing by dimensioning the outer sleeve accordingly. Optionally, the outer sleeve and the bearing body are not adheringly connected with one another.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention will now be described in more detail with reference to an exemplary embodiment. The appended drawings show in.

DETAILED DESCRIPTION OF THE PRESENTLY PREFERRED EMBODIMENT

Figure 1:
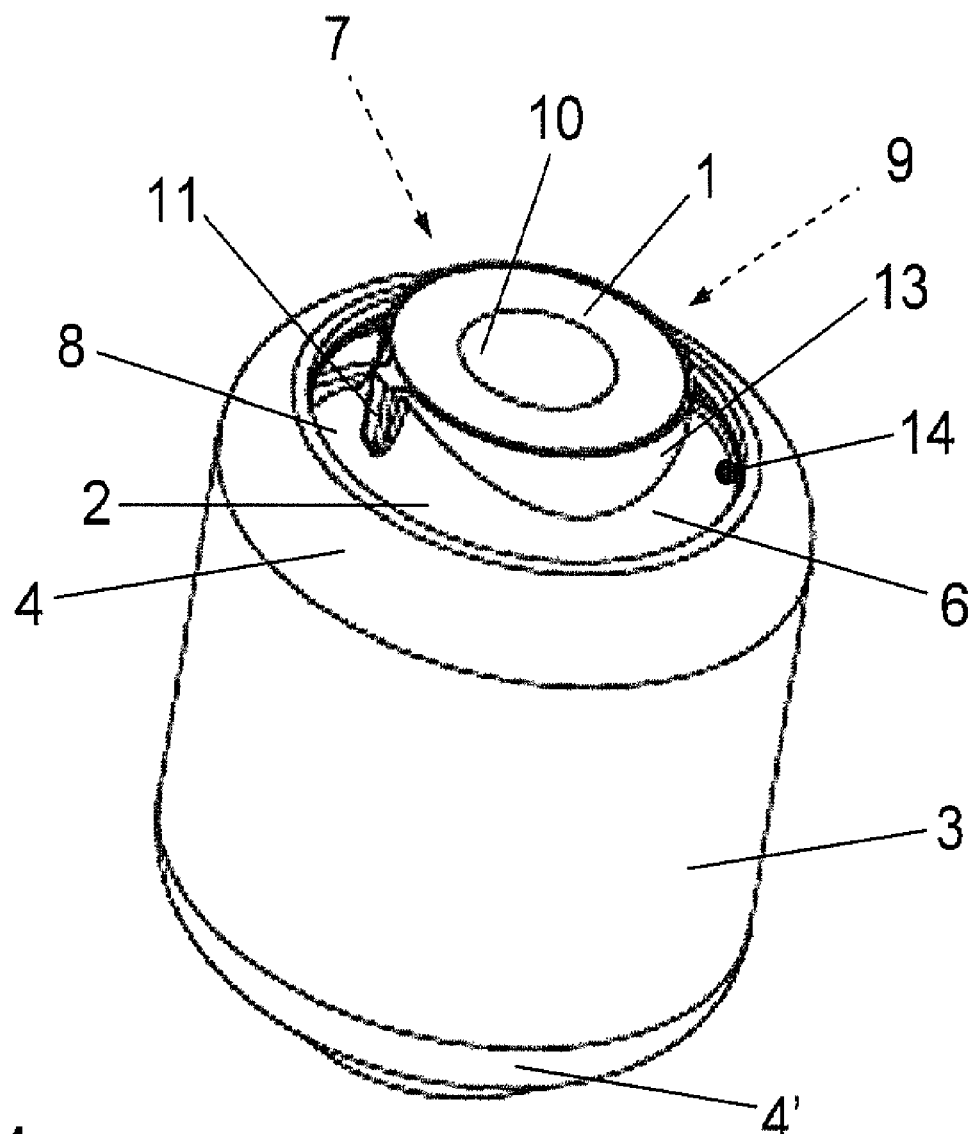
FIG. 1 a three-dimensional diagram of an exemplary embodiment of a bush bearing according to the invention, FIG. 2 the embodiment of FIG. 1 in a top view, and FIG. 3 the embodiment of FIG. 1 in an axial cross-section as indicated in FIG. 2.

FIG. 1 shows a three-dimensional diagram of a possible embodiment of the bearing according to the invention. The bearing includes, as described above, the metallic inner part 1, the outer sleeve 3 concentrically surrounding the inner part 1, and the elastomer bearing body 2 arranged between the inner part 1 and the outer part 3. It will be assumed for the depicted bearing that its inner part 1 is, for example, a cold-extruded steel part which is concentrically surrounded by an outer sleeve 3 made of steel, wherein the elastomer bearing body 2 disposed between the inner part 1 and the outer sleeve 3 is adheringly connected with both the inner part 1 and the outer sleeve 3 by vulcanization. As described above, the inner part 1 and the outer sleeve 3 can also be made of other materials, whereby an adherent connection need not exist between the bearing body 2 and the outer sleeve 3. In any event, the outer sleeve is flanged on both sides by forming respective inwardly oriented flanges 4, 4'.

According to the invention, the two axial end faces 5, 5' of the bearing body 1, of which only one end face is visible in FIG. 1, have an undulated, or more specifically approximately sinusoidal, contour. To this end, two respective wave troughs 6, 6', 7, 7' and two wave crests 8, 8', 9, 9' are formed on each of the end faces in the circumferential direction u, whereby the wave trough 7 and the wave crest 9 as well as the wave troughs 6', 7' and the wave crests 8', 9' corresponding to the wave troughs 6, 7 and the wave crests 8, 9 of the end face 5 are obscured in the drawing or not visible, so that the corresponding reference symbols have either been omitted or are only implied. Because their position is clear from the context of the drawings, the corresponding reference symbols should still be mentioned with respect to the wave troughs 6, 6', 7, 7' and wave crests 8, 8', 9, 9'. The contours of both end faces 5, 5' extend, as already mentioned several times, in a load-free bearing in the same direction. Stated differently, at a respective circumferential position where, for example, a wave trough 6, 7 is located on the end face 5 depicted on the drawing, a wave trough 6', 7' is likewise formed on the obscured end face 5. However, this does not prevent the wave troughs 6, 6', 7, 7' and wave crests 8, 8', 9, 9' from having different depths and/or heights in spite of the fact that contour of the two end faces 5, 5' has the same direction. For the load-free bearing, the contour of the end faces 5, 5' extends in the same direction also in the radial direction r, i.e., across the material thickness d of the bearing body 2. This means that wave troughs 6, 6', 7, 7' and wave crests 8, 8', 9, 9' extend radially across the entire material thickness of the bearing body in the respective circumferential segment. This is clearly shown in the FIGURE. The axially inward contour line 13 of the bearing body 2, which extends along the outer surface of the inner part 1, has wave troughs 6, 7 and wave crests 8, 9 at corresponding identical circumferential positions, much like the axially outward contour line 14 that extends along the inner surface of the outer sleeve 3.

For the intended installation, the bearing is installed so that the main load direction expected during operation coincides at least approximately with the radii extending through the wave troughs 6, 6', 7, 7'. For high radial loads in the main load direction and the resulting axial compression, the bearing body 2 can then yield in the region of the wave troughs 6, 6', 7, 7' in the axial direction toward the flanges 4, 4' of the outer sleeve 3, without expanding out of the bearing interior beyond the flange edges 15, 15'. Unlike conventionally constructed bearings, there is no risk even with an altogether softer radial characteristic, i.e., smaller radial stiffness and/or higher radial elasticity, that an elastomer expanding out of the bearing interior is sheared off at the flange edges 15, 15'. At the same time, the axial stiffness and load bearing capability of the bearing remains almost unchanged. For aiding in the installation with a correct orientation with respect to the main load direction, a position marking 11 is formed on the bearing, which in the depicted example is implemented by a fin 11 made of the elastomer material of the bearing body 2 which protrudes from the undulated contoured end face 5 in the axial direction a.

Figure 2:
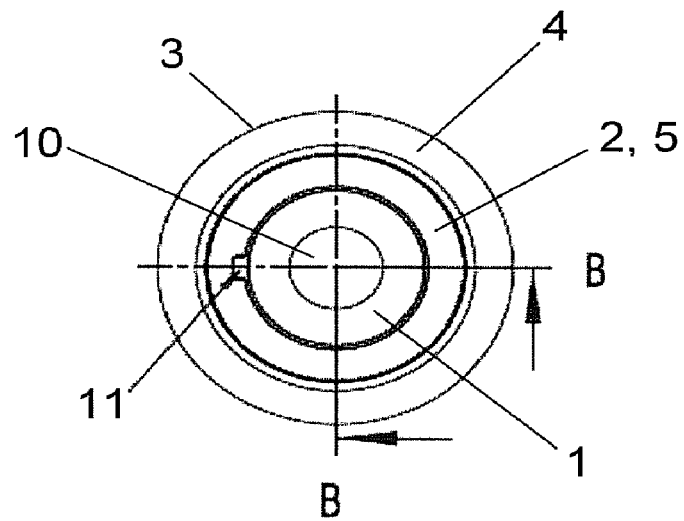
Figure 3:
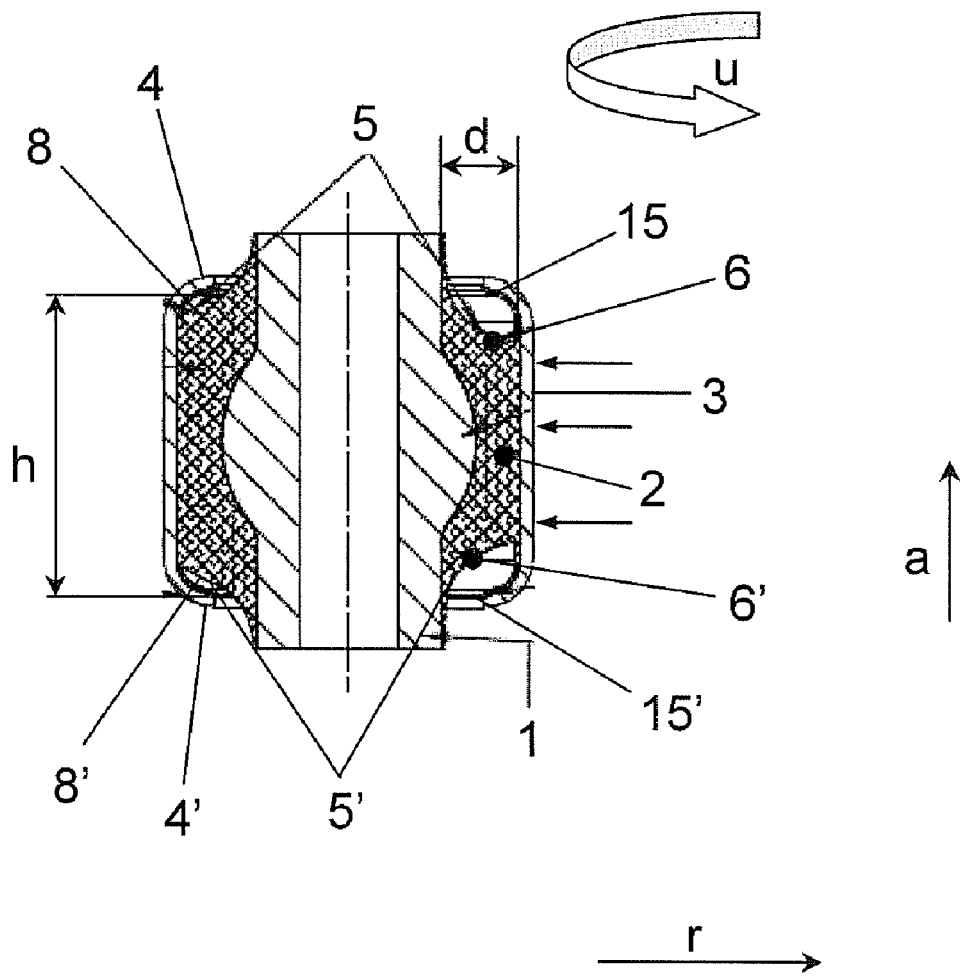

FIG. 2 shows again the bearing of FIG. 1 on a slightly smaller scale in a top view in the direction of one of its axial end faces 5. The special contour of the end face 5 is not discernible in this diagram. The drawing, which shows at least the basic elements of the bearing, namely its inner part 1, the outer sleeve 3, and the bearing body 2 with the positioning marking 11 formed thereon, is provided to illustrate the orientation of the cross-sectional view depicted in FIG. 3. The diagram of FIG. 3 is obtained by cutting out a segment delineated by the line B-B in FIG. 2 along the entire axial extent of the bearing. In the axial cross-section shown in FIG. 3, which is likewise shown on a smaller scale than FIG. 1, the elements of the bearing and in particular the special implementation of the contour of the axial end faces 5, 5' of the bearing body 2 are clearly visible. In particular, it can be clearly seen that the contours of both axial end faces 5, 5' have the same relative direction. As also shown, a wave trough 6 on end face 5 is located opposite a wave 6' on the other end face 5'. It can also be clearly seen that the material of the bearing body 2 in the region of the wave troughs 6, 6', 7, 7' has the necessary clearance to yield axially in the direction of the upper and/or lower flange edge 15, 15' in the event that a high radial load is applied from the direction of the arrows indicated on the right side in the direction of the outer sleeve 3. As also seen in the FIGURE, this is exactly the intent of the design according to the invention. In the depicted example, the metallic inner part has a spherical bulge in a radial center region 12. This improves the distribution of the stress in the elastomer, so that any differences in the circumferential direction of the radial stiffness do not have a detrimental effect, even when high radial loads operate in the direction of the wave troughs 6, 6', 7, 7'.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An elastomer bush bearing comprising
   a metallic inner part having a circular or elliptical cross-sectional area and a through opening having a uniform diameter extending in an axial direction through the inner part,
   a cylindrical outer sleeve surrounding the inner part, and
   an elastomer bearing body having axial end faces, said bearing body disposed between the inner part and the outer sleeve and adheringly connected at least with the inner part by vulcanization,
   wherein the cylindrical outer sleeve terminates at its axial ends in a corresponding circumferential flange oriented in the direction of the inner part,
   wherein each of the axial end faces of the bearing body comprises an undulated contour having wave troughs and wave crests, with the wave troughs and wave crests of one end face facing corresponding wave troughs and wave crests of the other end face, said contours being formed in the bearing body in the circumferential direction in the same direction and over a total material thickness of the bearing body, and an axial height of the bearing body along the axial direction varies continuously in the circumferential direction without formation of abrupt steps, and
   wherein the elastomer bush bearing further comprises means for marking at least one circumferential position of the bearing,
   wherein the elastomer bush bearing further comprises means for marking at least one circumferential position of the bearing, and
   wherein the means for marking comprise a groove formed on an inner surface of the inner part which surrounds the through opening, wherein the groove extends from one of the axial end faces in the axial direction towards an inside portion of the bearing or to the other end face.

2. An elastomer bush bearing comprising
   a metallic inner part having a circular or elliptical cross-sectional area and a through opening having a uniform diameter extending in an axial direction through the inner part,
   a cylindrical outer sleeve surrounding the inner part, and
   an elastomer bearing body having axial end faces, said bearing body disposed between the inner part and the outer sleeve and adheringly connected at least with the inner part by vulcanization,
   wherein the cylindrical outer sleeve terminates at its axial ends in a corresponding circumferential flange oriented in the direction of the inner part,
   wherein each of the axial end faces of the bearing body comprises an undulated contour having wave troughs and wave crests, with the wave troughs and wave crests of one end face facing corresponding wave troughs and wave crests of the other end face, said contours being formed in the bearing body in the circumferential direction in the same direction and over a total material thickness of the bearing body, and an axial height of the bearing body along the axial direction varies continuously in the circumferential direction without formation of abrupt steps, wherein the elastomer bush bearing further comprises means for marking at least one circumferential position of the bearing, wherein the elastomer bush bearing further comprises means for marking at least one circumferential position of the bearing and wherein the means for marking comprise a fin extending in the axial direction, with the fin being formed outside the bearing body on an outer surface of the inner part.

3. The elastomer bush bearing of claim 2, wherein the fin is formed of the elastomer material of the bearing body, and protrudes on an axial end face of the bearing body in the axial direction with respect to the undulated contour of the axial end face.

4. The elastomer bush bearing of claim 2, wherein the fin is formed of the material of the inner part and made as one piece with the inner part.

5. An elastomer bush bearing comprising a metallic inner part having a circular or elliptical cross-sectional area and a through opening having a uniform diameter extending in an axial direction through the inner part, a cylindrical outer sleeve surrounding the inner part, and an elastomer bearing body having axial end faces, said bearing body disposed between the inner part and the outer sleeve and adheringly connected at least with the inner part by vulcanization, wherein the cylindrical outer sleeve terminates at its axial ends in a corresponding circumferential flange oriented in the direction of the inner part, wherein each of the axial end faces of the bearing body comprises an undulated contour having wave troughs and wave crests, with the wave troughs and wave crests of one end face facing corresponding wave troughs and wave crests of the other end face, said contours being formed in the bearing body in the circumferential direction in the same direction and over a total material thickness of the bearing body, and an axial height of the bearing body along the axial direction varies continuously in the circumferential direction without formation of abrupt steps, wherein the elastomer bearing body is made of different materials for maintaining an approximately constant radial stiffness along the entire circumference of the bearing, wherein the different materials include spray-coating on an outer surface of the inner part in a region of the wave troughs and wave crests, and wherein the material spray-coated in a region of the wave crests has a smaller intrinsic stiffness than the material spray-coated in a region of the wave troughs.

\* \* \* \* \*